No. 611,542. Patented Sept. 27, 1898.
C. S. WILSON.
CART FOR TRANSPORTING FODDER, &c.
(Application filed July 20, 1897.)
(No Model.) 2 Sheets—Sheet 1.

WITNESSES INVENTOR

No. 611,542. Patented Sept. 27, 1898.
C. S. WILSON.
CART FOR TRANSPORTING FODDER, &c.
(Application filed July 20, 1897.)
(No Model.) 2 Sheets—Sheet 2.

WITNESSES: Geo. H. Scott
Geo. M. Wells

INVENTOR
Charles S. Wilson

UNITED STATES PATENT OFFICE.

CHARLES SAMUEL WILSON, OF NEAR MACOMB, ILLINOIS, ASSIGNOR OF ONE-HALF TO AMOS L. WILSON, OF KEOKUK, IOWA.

CART FOR TRANSPORTING FODDER, &c.

SPECIFICATION forming part of Letters Patent No. 611,542, dated September 27, 1898.

Application filed July 20, 1897. Serial No. 645,285. (No model.)

*To all whom it may concern:*

Be it known that I, CHARLES SAMUEL WILSON, a citizen of the United States, residing near Macomb, in the county of McDonough and State of Illinois, have invented a new and useful Cart for Transporting Fodder, Cane, or the Like, of which the following is a specification, reference being had to the accompanying drawings, in which—

Figure 1:
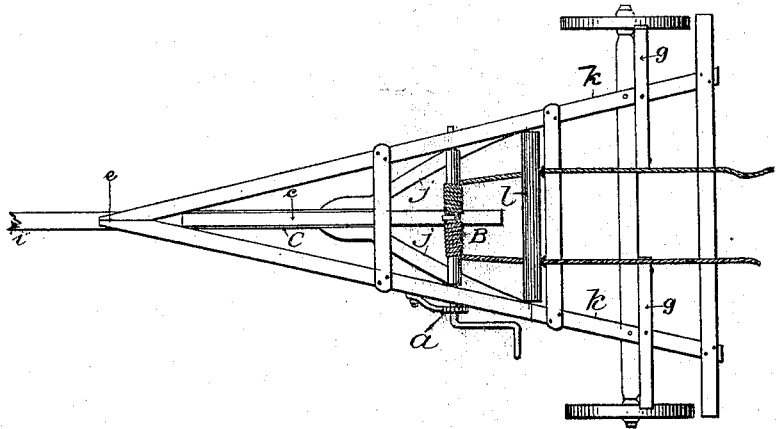
Figure 2:
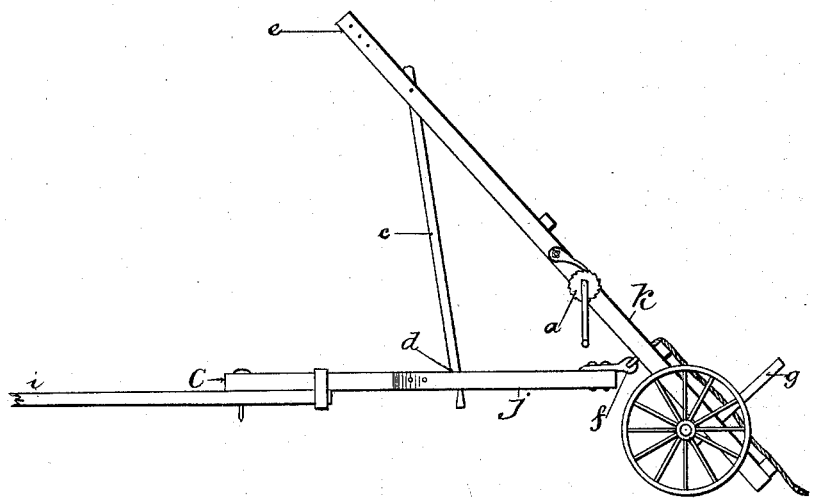
Figure 3:
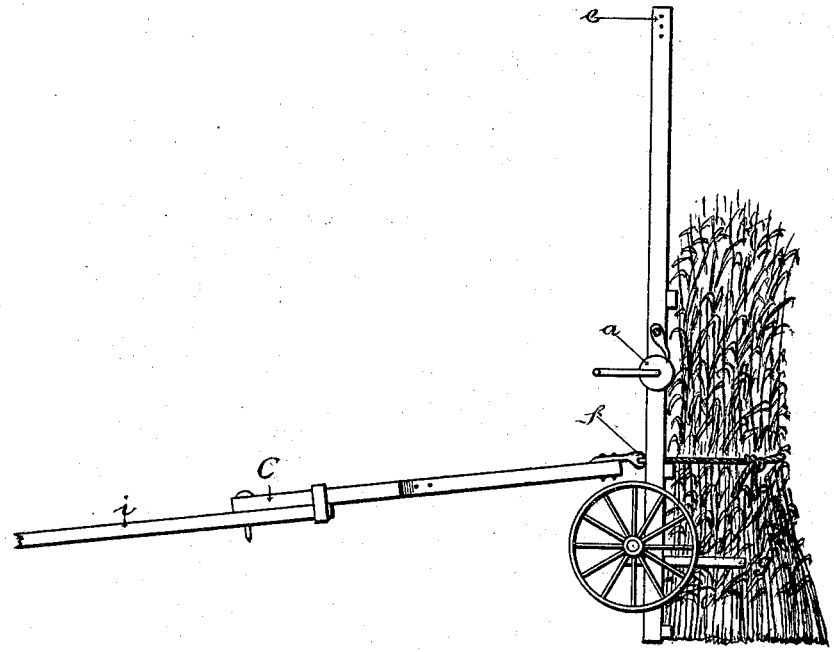
Figure 4:
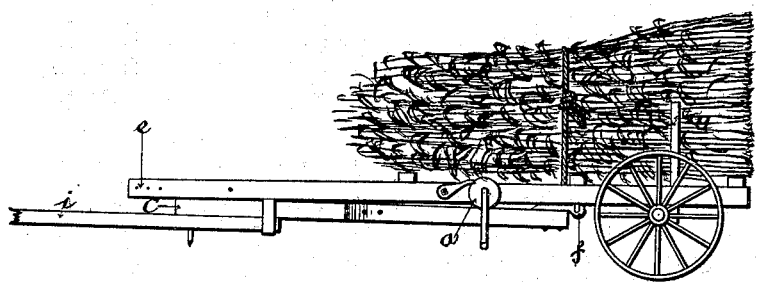

Figure 1 shows the top of the cart as it stands on the ground without a load. Fig. 2 shows a side view of the cart, with the angle-point of the frame e hoisted so as to bring into place frame-support c. This figure shows also the position of the cart at the shock before tilting the frame back, as shown by Fig. 3. Fig. 3 shows the frame thrown back, which is effected by a backward push by the team. It shows also the fodder lashed fast to the frame by means of a rope, which is shown in Fig. 1 wound upon drum b by a crank, shown in connection with ratchet-gearing a. Fig. 4 shows the frame in position for traveling, with the fodder loaded. This adjustment of the cart is effected automatically by a forward draft of the team without any effort of the operator. The fodder is drawn over and loaded by the adjustment of the cart or frame.

In Fig. 1 letter a shows ratchet-gearing on a shaft with crank. This shaft reaches through the frame, passing through the sills k, and is made fast to pulley-drum B. This arrangement is for the purpose of winding the rope around B to tighten it after passing it around the shock, as shown in Fig. 3. This rope (shown in Fig. 1) drops behind left sill k in Figs. 2, 3, and 4 at a point opposite f, runs under pulley-drum l, and forward to drum B, which drops behind a in the same figures.

Frame-support c, folded back under the frame in Fig. 1, drops into position in Fig. 2 by elevating e, and folds back in Fig. 4 by the forward motion of the cart. A recess is shown in c at d in Fig. 2 for the purpose of holding it in place.

Letter f discloses a hinge-joint in Figs. 2, 3, and 4. There are two of these hinge-joints. One attaches the right brace j to the right sill k. (Shown in Fig. 1.) The braces j form a part of the coupling-tongue C. The other hinge-joint attaches left brace j to left sill k. The whole plan of attaching the coupling-tongue to the cart by use of the hinge-joints is shown by letters C, j, k, and f in Figs. 1 and 2. These hinge-joints are made by setting an eye, made of a round iron rod, crosswise in the frame-sill k at f, (shown in Fig. 2,) and a hook or similar eye made through it is attached to brace j of the coupling-tongue C. This forms a complete hinge-joint, one to each brace, which allows the cart to be tilted back and forth without being detached from the coupling-tongue, as is shown by Figs. 2, 3, and 4. A fodder-support protruding at an upper angle so as to protect the wheels is shown by the letter g. A tongue i may be spliced with C and the cart used in that way, or the coupling-tongue C may be coupled to the front gearing of a farm-wagon and used in that way.

When the cart is to be loaded, it is backed up to the shock, so that the rear part of the frame touches the fodder. The front part of the cart-frame e is hoisted, so that frame-support c drops into position and is caught and held in place by recess d, as is shown by Fig. 2. In this position the rear part of the cart-frame rests upon the ground. The coupling tongue or frame C j j, being pivoted to the cart-frame at f in front of the wheels, now forces the cart-frame back into position, as is shown in Fig. 3, by a backward push of the team. The frame is thus placed against the shock, the rope is placed around the fodder, tied or hooked, as is shown in Fig. 3, and tightened by the use of the crank-drum B and ratchet-gearing A. (Shown in Fig. 1.) The shock, thus made fast to the cart-frame, is drawn over onto the cart by a forward draft of the team, again bringing into play the pivotal arrangement, and the frame drops into its natural horizontal position for traveling, with the fodder on top, as shown in Fig. 4.

As a general review the structure of the cart is based upon and includes, first, the principle of tilting the cart back to the load or to be loaded by the use of the hinge-joint f; second, the lashing or tying of the load fast to the cart in the manner set out in the specification and shown by Figs. 1 and 3, and, third, the self and automatic loading and adjusting of the cart, as shown by Fig. 4, by a forward draft of the team hitched to the cart with no effort on the part of the driver.

I claim—

1. In a fodder-cart the combination with a wheeled frame, the rear of which extends back of the axle so as to rest upon the ground in the act of loading and means for binding a load to said frame as it rests upon the ground, of a draft-frame pivoted to said wheeled frame, substantially as shown and described.

2. In a fodder-cart the combination with a wheeled frame, the rear of which extends back of the axle so as to rest upon the ground and elevate the wheels therefrom in the act of loading and means for binding a load to said frame as it rests upon the ground, of a draft-frame pivoted to said wheeled frame, substantially as shown and described.

3. In a fodder-cart the combination with a wheeled frame having its rear extend back of the axle to rest upon the ground, and having a folding support, and winding mechanism, of a draft-frame pivoted to said wheeled frame, substantially as shown and described.

4. In a fodder-cart the combination with a wheeled frame having a rear ground-support, a swinging catch or support, a winding device and deflecting roller in the rear thereof, of a draft-frame pivoted to the wheeled frame, substantially as shown and described.

CHARLES SAMUEL WILSON.

Witnesses:
GEO. H. SCOTT,
GEO. M. WELLS.